(12) United States Patent  
Erich

(10) Patent No.: US 7,779,871 B2
(45) Date of Patent: Aug. 24, 2010

(54) SERVICE UNIT FOR RESOURCE REPLENISHMENT

(75) Inventor: Bernd Erich, Waiblingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 1142 days.

(21) Appl. No.: 11/430,016

(22) Filed: May 9, 2006

(65) Prior Publication Data

US 2006/0254670 A1 Nov. 16, 2006

(30) Foreign Application Priority Data

May 10, 2005 (DE) .................... 10 2005 021 456

(51) Int. Cl.
*B65B 1/04* (2006.01)

(52) U.S. Cl. .................. 141/87; 141/88; 220/573

(58) Field of Classification Search ............ 141/86–88, 141/97, 363, 365, 369–371, 311 A; 220/573, 220/86.2

See application file for complete search history.

(56) References Cited

U.S. PATENT DOCUMENTS

| 1,699,889 | A |   | 1/1929 | Harlow et al. |
| 4,830,067 | A | * | 5/1989 | Foutch ..................... 141/86 |
| 5,718,471 | A |   | 2/1998 | McHorse |
| 5,785,099 | A |   | 7/1998 | Kashani |
| 5,833,528 | A |   | 11/1998 | Baum et al. |
| 5,992,481 | A |   | 11/1999 | Smith |
| 6,708,736 | B2 | * | 3/2004 | Bender ..................... 141/86 |

FOREIGN PATENT DOCUMENTS

| DE | 10 96 787 | B |   | 1/1961 |
| DE | 3200311 |   | * | 1/1982 |
| DE | 198 05 715 | A1 |   | 8/1998 |
| DE | 103 36 847 | A1 |   | 3/2005 |
| DE | 103 59 767 | B4 |   | 1/2006 |
| JP | 59144123 | A |   | 9/1984 |
| JP | 2542674 | B2 |   | 7/1997 |

OTHER PUBLICATIONS

German Office Action with English translation of pertinent portion dated Mar. 23, 2006 (Three (3) pages).
Machine translation of Japanese Official Action dated Apr. 24, 2009—Japanese Application No. 2006-129343.
European Search Report dated Sep. 8, 2006 (with English translation).
German Office Action dated Mar. 13, 2006 (with English translation).

* cited by examiner

*Primary Examiner*—Gregory L Huson
*Assistant Examiner*—Jason K Niesz
(74) *Attorney, Agent, or Firm*—RatnerPrestia

(57) ABSTRACT

A service unit for resource replenishment in an automobile with an engine has at least one filling nozzle and a drip cup at least partially covering the filling nozzle. The drop protection cover is attached for pivoting to the drip cup and, for advantageous resource replenishment, is displaced from a rest position within the drip cup to an at least partially swiveling protection position out of the drip cup.

12 Claims, 3 Drawing Sheets

SERVICE UNIT FOR RESOURCE REPLENISHMENT

This application claims the priority of German application 10 2005 021 456.8, filed May 10, 2005, the disclosure of which is expressly incorporated by reference herein.

Cross reference is hereby made to commonly assigned, related German application DE 10 2005 021 457.6, filed May 10, 2005.

BACKGROUND AND SUMMARY OF THE INVENTION

This invention relates to a service unit for resource replenishment, in an automobile with an engine, including at least one filling nozzle, and a drip cup at least partially covered by the at least one filling nozzle.

A service unit for a resource replenishment in an automobile with a drive engine is disclosed by German document DE 103 59 767. This service unit is primarily arranged in the automobile, for example in the trunk, and features a filling nozzle for resource replenishment, for example replenishment of drive engine coolant, as well as a drip cup at least partially covering the filling nozzle and serving to collect fluid spilled during resource replenishment and draining that fluid primarily through a downspout.

A service unit accessible through a door on a work machine, which has several filling nozzles for resources, is further known from U.S. Pat. No. 5,833,528. A drip cup for spilled fluids is not described, however.

An object of this invention is to propose a service unit for resource replenishment by which resource replenishment can be simplified.

This object is achieved by way of a service unit with a drop protection cover which is mounted for pivoting on the drip cup so that the drop protection cover is displaceable from a resting position within the drip cup into an at least partial protection position swiveled out from the drip cup. Further features are also claimed.

Primary advantages achieved by the invention are that fluid possibly spilled during resource replenishment performed by the service unit can be better absorbed and drained in the drip cup. Areas of the automobile covered by the drip cup and service unit respectively are therefore secured in an easy manner. This service unit, according to the invention, is especially useful in an automobile with the service unit located in the interior or in the trunk.

Soiling of automobile interior parts covering the service unit can therefore be avoided in most cases.

The service cup is preferably located in the interior or trunk of an automobile having an engine which is installed in a so-called middle or rear-end engine arrangement. Accordingly, the service unit can be located in the automobile's interior or trunk and contiguous to the engine.

The visual impression of the service unit can be especially improved in an advantageous manner when the service unit is located in the interior or the trunk.

For comfortable handling, the drop protection cover can be displaced autonomously from the rest position to the protection position when removing the cap.

It is preferred that the drop protection cover be particularly placed in its rest position in the drip cup.

The drop protection cover may be aligned with the available inner outline of the cup's edge.

An easy linkage of the drop protection cover can also be reached.

The drop protection cover can be displaced independently from the rest position to the protective position in a particularly easy manner according to at least one embodiment.

A spring is used for pre-stressing the drop protection cover in the setting direction in a particularly preferable design. The spring, for example, may be configured as a leg spring placed around the swivel axis of the drop protection cover.

According to a particularly favorable embodiment, the service unit can be placed on a straight automobile wall, for example a separating wall of the engine compartment or something similar, in which engine compartment the engine is located.

The invention is described in detail with below reference to the drawing figures.

DETAILED DESCRIPTION OF THE INVENTION

Figure 1:
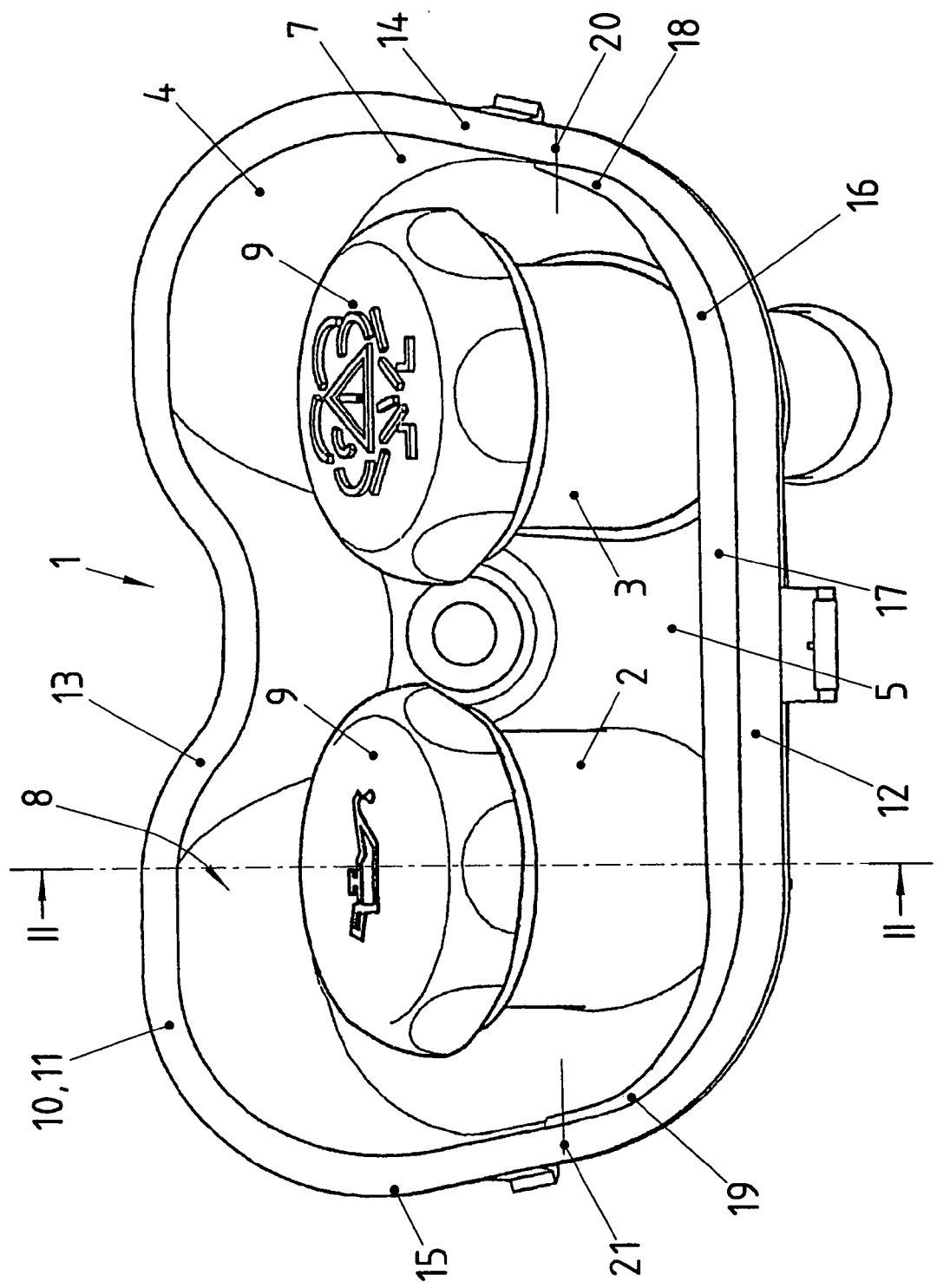
FIG. 1 is a perspective view of a service unit with a filling nozzle placed within the drip cup and a drop protection cover.

FIG. 1 shows a service unit 1 for replenishment of at least one resource for an engine (not shown) of an automobile not shown here. These resources can be such fluids, for example, as coolants, lubricants, hydraulic oil, refrigerant for air conditioning, or the like. Therefore, the service unit 1 has at least one filling nozzle 2 for resource replenishment. However, two filling nozzles 2 and 3 are provided in the illustrated embodiment, with the filling nozzle 2 used for filling the engine's lubricant and the filling nozzle 3 used for filling the cooling circuit for the engine. Further filling nozzles could be attached to the service unit. The filling nozzles 2 and 3 are surrounded by a drip cup 4 that exhibits a cup floor 5, which can be provided with a downspout that can be formed in the cup floor 5 itself or in the corner area 6 between the cup floor 5 and the cup wall 7 or in the cup wall 7 itself. The revolving, straight cup wall 7, coming from the cup floor 5, has an internal edge outline 8, which can be for example oval, circular, or rectangular, or provided with rounded corners if necessary. In any case, the drip cup 4 with its cup wall 7 exhibits an inner wall that is larger than the filling nozzles 2, 3 and the locking caps 9 attached to the nozzles respectively. The cup wall 7 forms a surrounding cup edge 11 with its free wall end 10 that covers a lower edge section 12, an upper edge section 13, and two lateral edge sections 14 and 15.

Figure 2:
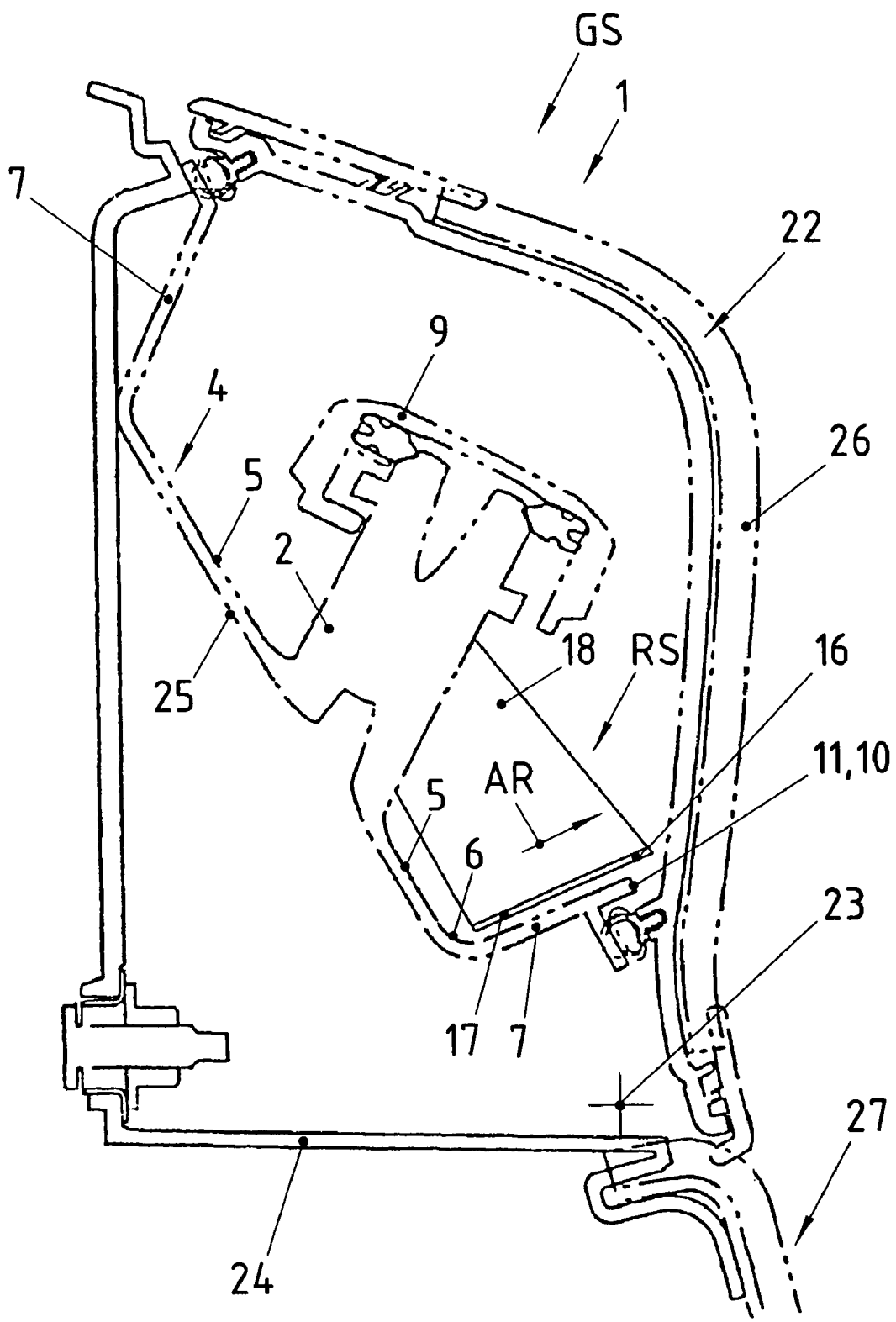
FIG. 2 is a sectional view of the service unit, with the drop protection cover in a rest position, along line II-II of FIG. 1.
Figure 3:
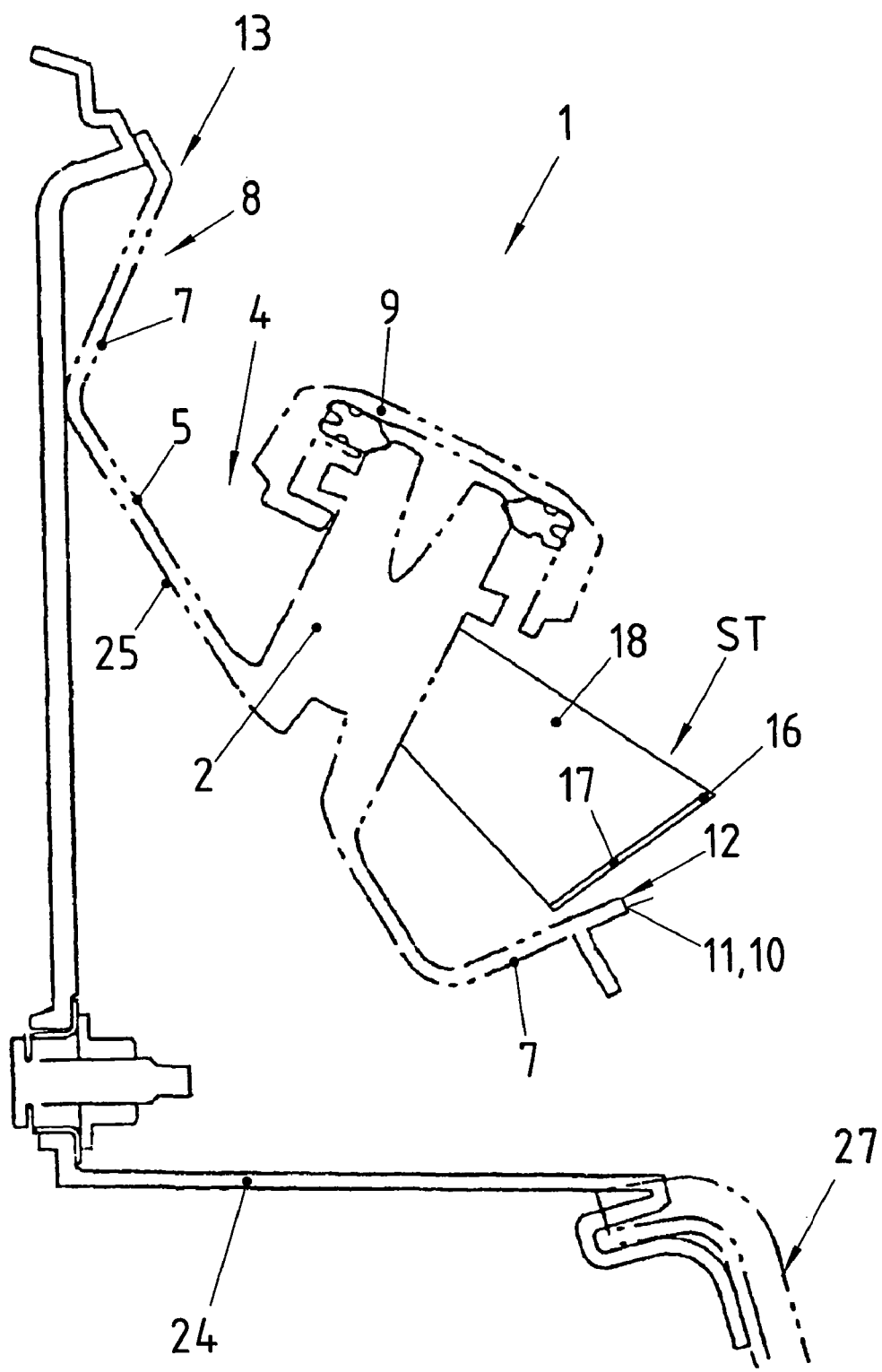
FIG. 3 is a sectional view through the service unit with the drop protection cover in a protective position.

The drip cup 4 is attached to a drop protection cover 16 that—as shown in FIG. 2—lies in a rest position within the drip cup 4, and—as FIG. 3 shows—can be displaced in an extended protective position beyond the cup edge 11. The drop protection cover 16 comprises an extension of the cup wall 7 in the extended protective position, so that an enlarged protective area provides absorption of fluid spilled during the resource replenishment through the filling nozzle 2 and 3. In order to displace the drop protection cover 16 from the rest position RS into the protective position ST, it is mounted pivotally on the drip cup 4. As shown in FIG. 1, the drop protection cover 16 is assigned to the lower edge section 12 of the cup edge 11 and moreover aligned with the inner edge outline 8 of the cup wall 7. In a preferred construction, the drop protection cover 16 is arranged in a u-form and therefore has a base 17 that is assigned to, or adjacent, the lower edge section 12. Furthermore, it contains lateral arms 18 and 19, which come from the base 17 and stretch at least partially along the inside of the collateral edge sections 14 and 15, respectively. In the areas of the clear ends of arms 18 and 19, respectively, the drop protection cover 16 is connected to the cup wall 7 with the swivel axes 20 and 21, so that the drop protection cover 16 can be swiveled around the swivel axes 20 and 21 of the rest position shown in FIG. 2 to the protection position shown in FIG. 3 and out of the drip cup 4.

In order to ease the swiveling of the drop protection cover 16 to the protection position, the intention is to pre-stress the drop protection cover 16 in the construction direction, from the rest position to the protection position, so that the swiveling happens automatically and autonomously. This swiveling in the construction direction can happen autonomously when a cap 22 covering the drip cup 4 (see FIG. 2) is arranged in the service unit 1 and is attached to the drip cup 4, for example, that closes the service unit and the required filling nozzle 2 and 3 respectively in its closed position GS, shown in FIG. 2. This cap 22 is detachable from the drip cup 4. It is especially preferable to mount a lower edge of the cap 22 for tilting around a hinge axis 23, so that the cap 22 can be folded as a flap around the axis 23 to an open position not shown here. In doing so, the drop protection cover 16 is folded automatically as soon as the cap 22 is moved to the opening position. This is clarified by the cap 22 not being shown in FIG. 3. By closing the cap 22 again, the drop protection cover 16 is automatically pushed back into the rest position.

FIGS. 2 and 3 show the actual installation position of the service unit 1 in the automobile not shown here. Therefore, it is obvious that the service unit 1 and the drip cup 4 are respectively arranged almost upright in the automobile. This, for example, occurs at an almost vertical body wall and a separating plate respectively, both not shown here, which limit receiving space for the automobile's engine and divide the receiving space and the trunk respectively in which the service unit 1 lies in the trunk. An installation frame 24 is attached to the wall of the body and carries the service unit 1. Although not shown in FIG. 2 and 3, the filling nozzles 2 and 3 respectively continue behind the reverse side 25 of the cup floor beyond the installation frame 24 and therefore lead to the engine and its cooling circuit, respectively. FIG. 2 furthermore shows that the cap 22 can be covered with a covering element 26, for example carpet, which can also be intended for a covering 27 of the trunk adjoining the cap 22.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A service unit for resource replenishment in an automobile with an engine, comprising:
   at least one filling nozzle,
   a drip cup at least partially surrounding the at least one filling nozzle, and
   a drop protection cover which is mounted for pivoting on the drip cup so that the drop protection cover is displaceable from a resting position within the drip cup into an at least partial protection position swiveled out from the drip cup,
   wherein the drop protection cover is fitted to an inner edge outline of the drip cup,
   wherein the drop protection cover is arranged in a u-form with a base and two lateral arms.

2. The service unit according to claim 1, wherein the drip cup is provided with a detachable cap that closes the drip cup and thereby covers the filling nozzle.

3. The service unit according to claim 2, wherein the drop protection cover is displaced autonomously from the rest position to the protection position when removing the cap.

4. The service unit according to claim 1, wherein the drop protection cover is connected with its lateral arms on swiveling axes and to the drip cup.

5. The service unit according to claim 3, wherein the drop protection cover is pre-stressed from the rest position into the protection position.

6. The service unit according to claim 2, wherein the drip cup is arranged approximately upright in the automobile, wherein the cap is attached on a lower edge outline of the drip cup and wherein the drop protection cover is disposed adjacent the lower edge outline.

7. The service unit according to claim 2, wherein the drop protection cover is displaced autonomously from the rest position to the protection position when removing the cap.

8. The service unit according to claim 7, wherein the drop protection cover is pre-stressed from the rest position into the protection position.

9. A service unit for resource replenishment in an automobile with an engine, comprising:
   at least one filling nozzle,
   a drip cup at least partially surrounding the at least one filling nozzle, and
   a drop protection cover which is mounted for pivoting on the drip cup so that the drop protection cover is displaceable from a resting position within the drip cup into an at least partial protection position swiveled out from the drip cup,
   wherein the drip cup is provided with a detachable cap that closes the drip cup and thereby covers the filling nozzle,
   wherein the drop protection cover is pre-stressed from the rest position into the protection position,
   wherein the drop protection cover is displaced autonomously from the rest position to the protection position when removing the cap, wherein when the drip cup is oriented approximately upright in a vehicle and the drop protection cover is oriented in the protection position, the drop protection cover is configured to channel fluid into the drip cup.

10. A service unit for resource replenishment in an automobile with an engine, comprising:
    at least one filling nozzle,
    a drip cup at least partially surrounding the at least one filling nozzle, and
    a drop protection cover which is mounted for pivoting on the drip cup so that the drop protection cover is displaceable from a resting position within the drip cup into an at least partial protection position swiveled out from the drip cup,
    wherein the drip cup is provided with a detachable cap that closes the drip cup and thereby covers the filling nozzle,
    wherein the drop protection cover is displaced autonomously from the rest position to the protection position when removing the cap, wherein when the drip cup is oriented approximately upright in a vehicle and the drop protection cover is oriented in the protection position, the drop protection cover is configured to channel fluid into the drip cup.

11. The service unit according to claim 10, wherein the drop protection cover is pre-stressed from the rest position into the protection position.

12. The service unit according to claim 1, wherein when the drip cup is oriented approximately upright in a vehicle and the drop protection cover is oriented in the protection position, the drop protection cover is configured to channel fluid into the drip cup.

* * * * *